(12) United States Patent
Davies et al.

(10) Patent No.: US 9,160,915 B1
(45) Date of Patent: Oct. 13, 2015

(54) MODIFYING DEVICE FUNCTIONALITY BASED ON DEVICE ORIENTATION

(71) Applicant: Amazon Technologies, Inc., Reno, NV (US)

(72) Inventors: Joshua Paul Davies, Fremont, CA (US); Edward A. Liljegren, San Francisco, CA (US)

(73) Assignee: Amazon Technologies, Inc., Reno, NV (US)

(*) Notice: Subject to any disclaimer, the term of this patent is extended or adjusted under 35 U.S.C. 154(b) by 324 days.

(21) Appl. No.: 13/737,755

(22) Filed: Jan. 9, 2013

(51) Int. Cl.
*G09G 5/30* (2006.01)
*H04N 5/232* (2006.01)

(52) U.S. Cl.
CPC .................. *H04N 5/232* (2013.01)

(58) Field of Classification Search
CPC ....................................... H01F 38/00
USPC ....................................... 345/659
See application file for complete search history.

(56) References Cited

U.S. PATENT DOCUMENTS

| | | | | |
|---|---|---|---|---|
| 6,466,198 B1* | 10/2002 | Feinstein | | 345/158 |
| 8,358,321 B1* | 1/2013 | Weidner | | 345/659 |
| 8,896,632 B2* | 11/2014 | MacDougall et al. | | 345/659 |
| 2006/0082518 A1* | 4/2006 | Ram | | 345/1.1 |
| 2009/0096219 A1* | 4/2009 | Annis et al. | | 290/1 R |
| 2009/0212637 A1* | 8/2009 | Baarman et al. | | 307/104 |
| 2009/0244019 A1* | 10/2009 | Choi | | 345/173 |
| 2010/0123737 A1* | 5/2010 | Williamson et al. | | 345/672 |
| 2010/0245267 A1* | 9/2010 | Min et al. | | 345/173 |
| 2011/0047459 A1* | 2/2011 | Van Der Westhuizen | | 715/702 |
| 2011/0098087 A1* | 4/2011 | Tseng | | 455/557 |
| 2011/0201911 A1* | 8/2011 | Johnson et al. | | 600/365 |
| 2012/0026098 A1* | 2/2012 | Ladouceur et al. | | 345/173 |
| 2012/0050685 A1* | 3/2012 | Bartlett et al. | | 351/223 |
| 2012/0081316 A1* | 4/2012 | Sirpal et al. | | 345/173 |
| 2012/0106747 A1* | 5/2012 | Crockett et al. | | 381/57 |
| 2013/0076595 A1* | 3/2013 | Sirpal et al. | | 345/1.3 |
| 2013/0076649 A1* | 3/2013 | Myers et al. | | 345/173 |
| 2013/0141464 A1* | 6/2013 | Hunt et al. | | 345/659 |
| 2013/0169549 A1* | 7/2013 | Seymour et al. | | 345/173 |
| 2013/0210525 A1* | 8/2013 | Sizelove et al. | | 463/37 |
| 2013/0239063 A1* | 9/2013 | Ubillos et al. | | 715/838 |
| 2014/0044286 A1* | 2/2014 | Coles et al. | | 381/150 |
| 2014/0085452 A1* | 3/2014 | Nistico et al. | | 348/78 |
| 2014/0087673 A1* | 3/2014 | Mostov et al. | | 455/78 |

* cited by examiner

*Primary Examiner* — Javid A Amini
(74) *Attorney, Agent, or Firm* — Sutherland Asbill & Brennan LLP

(57) ABSTRACT

An orientation associated with an electronic device may be identified. The orientation may correspond to a first orientation or a second orientation, which may each correspond to any orientation within respective ranges of orientations. The device may include an adjustment element for adjusting an operational parameter associated with the device. If the identified orientation corresponds to the first orientation, a first adjustment of the operational parameter may be associated with actuation of a first portion of the adjustment element and a second adjustment of the operational parameter may be associated with actuation of a second portion of the adjustment element. If the identified orientation corresponds to the second orientation, the second adjustment of the operational parameter may be associated with actuation of the first portion and the first adjustment of the operational parameter may be associated with actuation of the second portion.

26 Claims, 7 Drawing Sheets

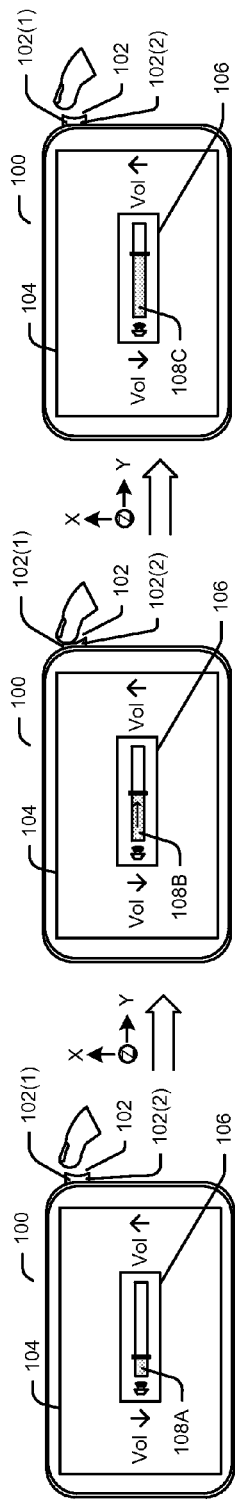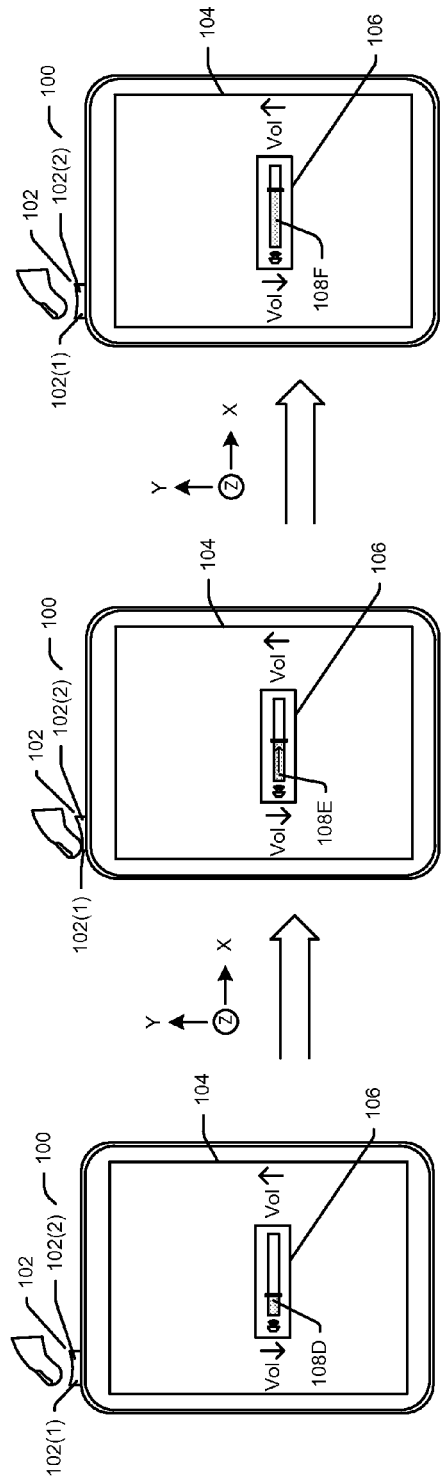

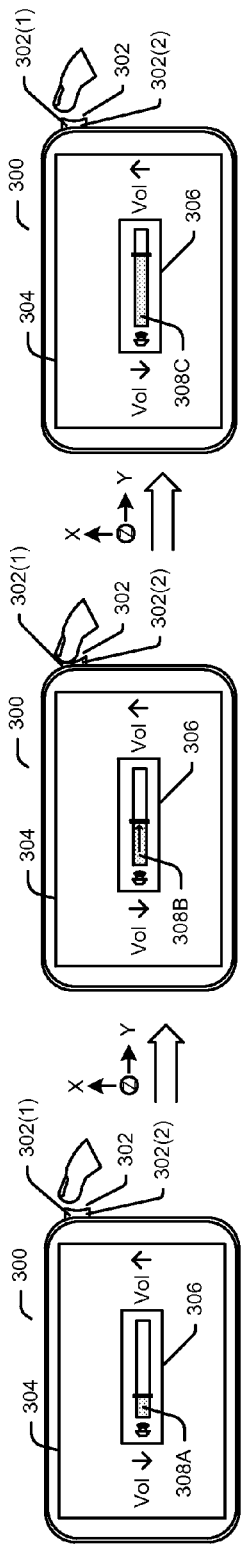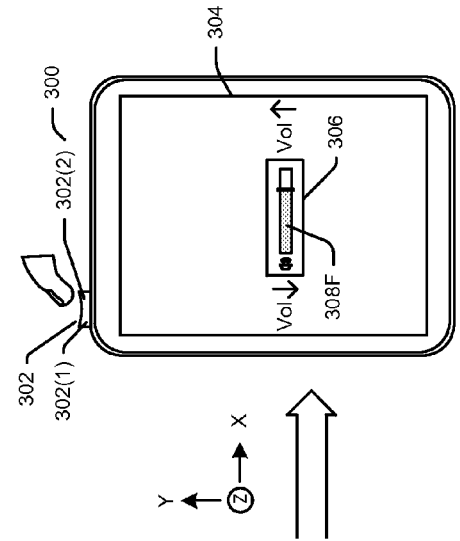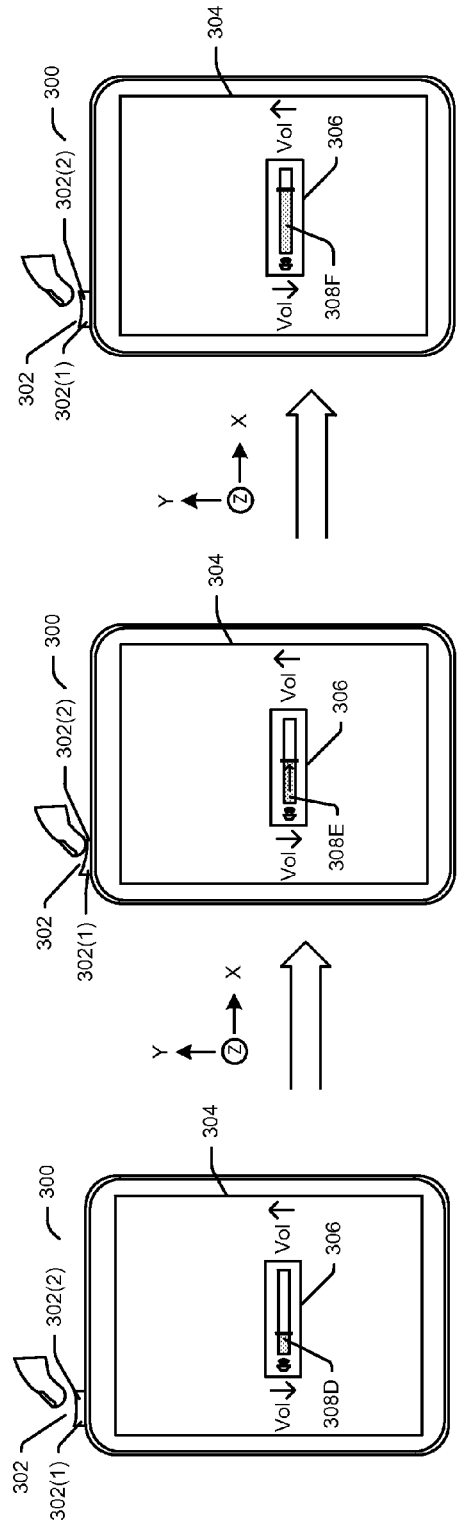

MODIFYING DEVICE FUNCTIONALITY BASED ON DEVICE ORIENTATION

BACKGROUND

Many electronic devices include physical buttons or switches for adjusting various parameters or otherwise controlling device functionality. For example, electronic devices include a power button or switch that enables powering the device on and off. Electronic devices also typically include a button or switch that upon actuation by a user of the device may enable the volume level of the device to be adjusted. In certain electronic devices, a softkey button or switch may be provided that is flexibly programmed to invoke a variety of functions. A desired function for the softkey may be selected by a user of the device via, for example, a user interface associated with the device or may be invoked based on a predefined association with an application being executed on the device.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

FIGS. 1A-1C schematically depict an illustrative use case involving adjustment of an operational parameter of a conventional electronic device when the device is positioned in a first orientation.

FIGS. 1D-1F schematically depict an illustrative use case involving adjustment of an operational parameter of the conventional electronic device depicted in FIGS. 1A-1C when the device is positioned in a second orientation that is different from the first orientation.

FIGS. 3A-3C schematically depict an illustrative use case that involves adjustment of an illustrative operational parameter of an electronic device when the device is positioned in a first orientation in accordance with one or more embodiments of the disclosure.

FIGS. 3D-3F schematically depict an illustrative use case that involves adjustment of the illustrative operational parameter of the electronic device depicted in FIGS. 3A-3C when the device is positioned in a second orientation that is different from the first orientation in accordance with one or more embodiments of the disclosure.

DETAILED DESCRIPTION

Overview

Figure 2:
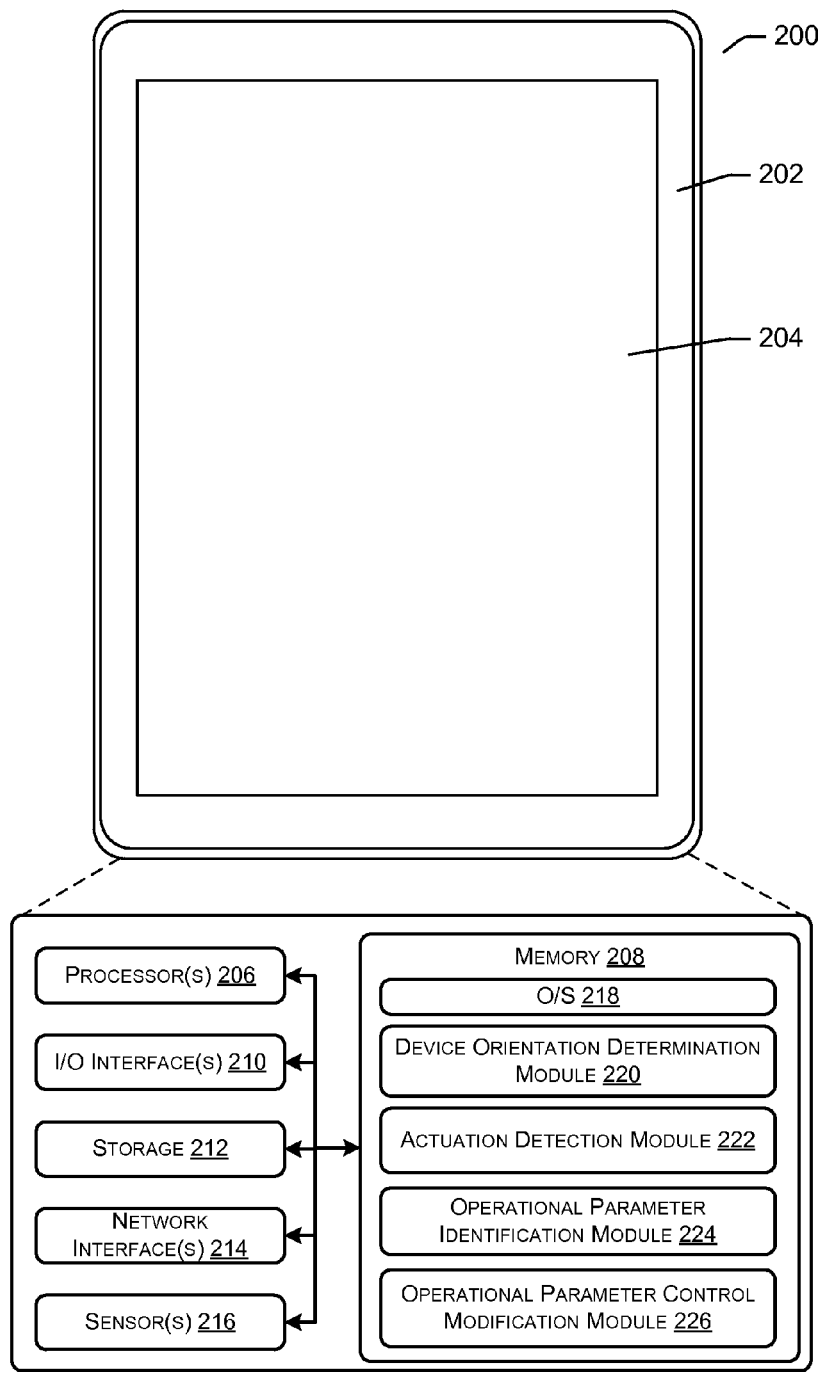
FIG. 2 schematically depicts an illustrative electronic device in accordance with one or more embodiments of the disclosure.

This disclosure relates to, among other things, systems, methods, computer-readable media, techniques and methodologies for modifying device functionality based on an orientation of a device. A variety of types of functionality may be modified based on device orientation. For example, functionality associated with an adjustment element of an electronic device that enables adjustment of one or more operational parameters may be modified based on a change in the orientation of the device. As a non-limiting example, an adjustment element of an electronic device may enable adjustment of a volume level associated with a device, a magnification level associated with an image capturing device provided as part of or otherwise associated with the electronic device, a display parameter associated with a display of the electronic device (e.g., a brightness level, a contrast level, a tint level, etc.), and so forth. Another non-limiting example of device functionality that may be modified based on device orientation is stereophonic sound. For example, directionality associated with two or more independent audio channels associated with a device may be modified based on a change in device orientation. It should be appreciated that the above-described examples of operational parameters and/or device functionality to which embodiments of this disclosure are applicable are not exhaustive and that any suitable parameters are encompassed within the scope of this disclosure.

The adjustment element described above may include, but is not limited to, one or more electromechanical switches, each having one or more sets of electrical contacts and any of a variety of types of actuating mechanisms. The actuating mechanism may be configured to apply an operating force that brings a set of electrical contacts together (e.g., closes the switch) and completes an electrical circuit. When the operating force is not applied (e.g., the switch is open), the flow of current may be interrupted and the electrical circuit may be rendered non-conducting.

The adjustment element may include any suitable type of switch having any suitable type of actuating mechanism including, but not limited to, a toggle switch, a rocker switch, a rotary switch, push-button switches, and so forth. The term "adjustment element" encompasses both a single switch or button (e.g., a rocker or rotary switch) or multiple switches or buttons that operate cooperatively to control adjustment of an operational parameter (e.g., multiple buttons that enable volume adjustment). At times herein, the terms "adjustment element," "switch" and "button" may be used interchangeably. The adjustment element may transition from a non-actuated state to an actuated state when a force is applied to an actuating mechanism of the adjustment element. As used herein, if an action is described as being taken or an event is described as occurring "when" another event occurs, it should be appreciated that the action may be taken or the event may occur upon or subsequent to the another event occurring.

In the illustrative case of a rocker switch provided in connection with an electronic device, when an external force is applied such as by a user of the device to either a first portion or a second portion of the switch, the switch may transition to a respective actuated state that enables adjustment of an operational parameter of the device. More specifically, a value representative of an operational parameter (e.g., a volume level) may be adjusted (e.g., increased or decreased) upon application of a force to a first portion of the switch that causes the switch to transition into a first actuated state. Correspondingly, the value representative of the operational parameter may be adjusted in an opposing direction upon application of a force to a second portion of the switch that causes the switch to transition into a second actuated state. In certain scenarios, the switch may be maintained in an actuated state only so long as the external force is applied (e.g., momentarily actuated switches). In other scenarios, the switch may be continuously maintained in an actuated state upon application of an external force, requiring application of an opposing external force to transition the switch to a non-actuated state.

As another non-limiting example, in the illustrative case of push-button switches, a first push-button switch and a second push-button switch may be provided for adjusting an operational parameter. When an external force is applied to the first push-button switch, the switch may transition to an actuated state according to which a value associated with an operational parameter (e.g., a volume level) may be adjusted in a particular direction (e.g., increased or decreased). Correspondingly, when an external force is applied to the second push-button switch, the switch may transition to an actuated state according to which the value associated with the operational parameter may be adjusted in an opposing direction (e.g., decreased if increased upon actuation of the first push-button switch or increased if decreased upon actuation of the first push-button switch). It should be appreciated that the foregoing examples are merely illustrative and that numerous other types of switches may be provided for adjusting various operational parameters (e.g., rotary switches). It should be appreciated that in certain embodiments the terms "first portion of an adjustment element" and "second portion of an adjustment element" may each refer to part of a same switch or button such as when the adjustment element corresponds to a single switch or button. In various other embodiments, such as those in which the adjustment element includes multiple switches or buttons, the terms "first portion of an adjustment element" and "second portion of an adjustment element" may each refer to a respective one of the switches or buttons.

As will be described in greater detail hereinafter, electronic devices and associated component(s) in accordance with embodiments of the disclosure provide numerous advantages and technical effects over conventional devices including, but not limited to, dynamic modification—based on an orientation of the device—of the manner in which an adjustment element enables adjustment of an operational parameter associated with the device, dynamic modification—based on an orientation of the device—of device functionality such as directionality of stereo sound output from the device, and so forth.

FIGS. 1A-1C schematically depict an illustrative use case that involves adjustment of an operational parameter of a conventional electronic device when the device is positioned in a first orientation. FIGS. 1D-1F schematically depict an illustrative use case that involves adjustment of the operational parameter of the conventional electronic device depicted in FIGS. 1A-1C when the device is positioned in a second orientation that is different from the first orientation. As depicted in FIGS. 1A-1F, in a conventional electronic device 100, the manner in which an operational parameter may be adjusted via operation of a switch is unchanged regardless of an orientation of the device. While a rocker switch is illustratively shown in FIGS. 1A-1F, the following discussion regarding the operation of conventional electronic devices is applicable to any type of one or more switches that enable adjustment of an operational parameter associated with the device (e.g., a rocker switch, a rotary switch, a set of multiple push-button switches, etc.).

Referring to FIG. 1A, the device 100 is shown as being oriented in a first orientation (e.g., a landscape orientation). The illustrative device 100 may include a display panel 104 configured to display content. A switch 102 may be provided as part of the device 100. The switch 102 may be configured to enable an operational parameter associated with the device 100 to be adjusted. In FIGS. 1A-1F, the illustrative operational parameter shown as being adjustable using the switch 102 is a volume level of the device. The switch is illustratively depicted as a rocker switch that includes a first portion 102(1) and a second portion 102(2). Application of an external force to the first portion 102(1) of the switch 102 may cause the switch 102 to transition to a first actuated state resulting in an upward adjustment of the volume level. Correspondingly, application of an external force to the second portion 102(2) of the switch 102 may cause the switch 102 to transition to a second actuated state resulting in a downward adjustment of the volume level.

The device may be configured to present an indicator 106 of a current volume level of the device via the display panel 104. In FIG. 1A, the indicator 106 provides an indication 108A of an illustrative initial volume level of the device 100 when the switch 102 is in a non-actuated state. In FIG. 1B, an external force is shown as being applied by, for example, a user of the device 100 to the first portion 102(1) of the switch 102. Upon application of the external force to the first portion 102(1) of the switch 102, the switch 102 may transition to a first actuated state. In the first actuated state, a pair of electrical contacts may be brought into contact with one another thereby generating a signal based on which the volume level of the device 100 may be increased. As schematically depicted in FIG. 1B, the indicator 106 may provide an indication 108B of an instantaneous volume level of the device 100. As long as the switch 102 is maintained in the first actuated state, the indication 108B may dynamically change in a manner that reflects the increase in the volume level. FIG. 1C depicts a device state in which the external force is removed from the first portion 102(1) of the switch 102 and the switch 102 is permitted to transition once again to a non-actuated state. The indicator 106 provides an indication 108C of the current volume level which has been increased from the initial volume level schematically depicted in FIG. 1A as a result of the external force schematically depicted as being applied to the first portion 102(1) of the switch 102 in FIG. 1B.

Referring now to FIG. 1D, the device 100 is shown as being oriented in a second orientation (e.g., a portrait orientation) that is different from the first orientation depicted in FIGS. 1A-1C. In FIG. 1D, the indicator 106 provides an indication 108D of an illustrative initial volume level of the device 100 when the switch 102 is in a non-actuated state. In FIG. 1E, an external force is shown as being applied by, for example, a user of the device 100 to the first portion 102(1) of the switch

102. As described earlier through reference to FIGS. 1A-1C, upon application of the external force to the first portion 102(1) of the switch 102, the switch 102 may transition to a first actuated state and the volume level of the device 100 may be increased. As schematically depicted in FIG. 1E, the indicator 106 may provide an indication 108E of an instantaneous volume level of the device 100 that dynamically changes in a manner that reflects the increase in the volume level. FIG. 1F depicts a device state in which the external force is removed from the first portion 102(1) of the switch 102 and the switch 102 is permitted to transition once again to a non-actuated state. The indicator 106 provides an indication 108F of the current volume level which has been increased from the initial volume level schematically depicted in FIG. 1D as a result of the external force that was applied.

As shown in FIGS. 1A-1F, in a conventional device such as device 100, the direction in which the volume level is adjusted upon application of an external force to the first portion 102(1) of the switch 102 is unchanged despite the change in the orientation of the device 100. Stated another way, in conventional devices such as device 100, the first actuated state (which in this illustrative example corresponds to application of a force to the first portion 102(1) of the switch 102) is associated with a same directional adjustment of the volume level (e.g., either an increase or a decrease in the volume level) regardless of an orientation of the device. Further, although not depicted in FIGS. 1A-1F, application of an external force to the second portion 102(2) of the switch 102 may cause the switch 102 to transition to a second actuated state in which the volume level is adjusted in an opposing direction (e.g., downwards) as compared to the first actuated state. Similar to the first actuated state, in conventional devices, the second actuated state is associated with a same directional adjustment of the volume level of the device regardless of an orientation of the device. Accordingly, the functionality provided by switches of conventional electronic devices is counterintuitive because a particular actuated state of the switch is associated with a same directional adjustment of an operational parameter (e.g., the volume level) regardless of an orientation of the device.

It should be appreciated that while the above discussion of conventional electronic devices is presented in the context of switches that enable adjustment of a volume level, the discussion is equally applicable to switches that enable adjustment of other operational parameters including softkey switches that are capable of being flexibly programmed to enable adjustment of a variety of different operational parameters. It should further be appreciated that while application of an external force to the first portion 102(1) of the switch 102 is illustratively described as causing an increase in an operational parameter (e.g., a volume level) and application of an external force to the second portion 102(2) of the switch 102 is illustratively described as causing an opposing decrease in a same operational parameter, this functionality may be reversed. Regardless of which directional adjustment in the value of an operational parameter is enabled by a particular actuated state of a switch, the association between a particular directional adjustment and a particular actuated state of a switch in conventional devices is static and does not change based on an orientation of the device.

In addition, in conventional devices, any device functionality having a directionality associated therewith with respect to components of the device remains static notwithstanding a change in device orientation. For example, a conventional device may provide stereophonic sound capabilities using two or more independent audio channels through a configuration of two or more speakers. In such a device, the correspondence between a particular speaker and a particular audio channel does not change with a change in orientation of the device. For example, if a conventional device with such stereophonic capabilities is held upside down or otherwise rotated 180 degrees, audio information output from a right speaker will continue to be output from the same speaker. The same is true for the left speaker. However, when the device's orientation is changed from a typical device position (e.g., "right side up") and is rotated by approximately 180 degrees, what is initially a right speaker becomes a left speaker and vice versa. Accordingly, the resultant audio information output from such a conventional device is distorted from the intended output because a desired directionality of the audio information is reversed.

In contrast, according to one or more embodiments of the disclosure, the association between a particular actuated state of an adjustment element that enables adjustment of an operational parameter associated with an electronic device and a particular directional adjustment of the operational parameter may dynamically change based on a detected change in an orientation of the device. In those embodiments in which the adjustment element corresponds to a single switch or button, a particular actuated state may correspond to actuation of a particular portion of the switch or button. In those embodiments in which the adjustment element includes multiple switches or buttons that together enable adjustment of an operational parameter, a particular actuated state may correspond to actuation of a particular switch or button among the multiple switches or buttons. In addition, according to embodiments of the disclosure, a correspondence between a device component and functionality provided by the component may be modified based on a change in device orientation. For example, an association between a particular speaker and a particular audio channel may be modified (e.g., reversed) based on a change in device orientation such that a directionality associated with the device functionality is maintained.

The electronic device may be any suitable device including, but not limited to, a tablet device such as a mobile tablet device with voice and/or data capabilities, a mobile device such as a smartphone or other cellular device with voice and/or data capabilities, a personal digital assistant (PDA), a gaming console, a gaming controller, a device capable of recording or playing audio and/or video content, or any other suitable device.

In various embodiments of this disclosure, an adjustment element may be provided that enables adjustment of an operational parameter associated with an electronic device. The adjustment element may be configured to control a single operational parameter or may be softkeyed to control any of a variety of operational parameters. The adjustment element may include, for example, any of a variety of types of electromechanical switches having any suitable associated actuating mechanism. For example, the adjustment element may include a rocker switch, a toggle switch, a rotary switch, a plurality of push-button switches, and so forth. While illustrative embodiments of the disclosure may be depicted and described herein in the context of a rocker switch, it should be appreciated that techniques and methodologies described herein are applicable to a broad range of types of adjustment elements for adjusting a variety of operational parameters.

In accordance with one or more embodiments of the disclosure, when an external force is applied to a first portion of an adjustment element, the adjustment element may transition to a first actuated state. Upon detection that the adjustment element is in the first actuated state, an orientation of the device may be determined. Alternatively, an orientation of the device may be determined prior to detection of the first actuated state. The orientation of the device may be determined, for example, based on one or more signals received from one or more device orientation sensing elements that may be provided as part of the device.

The one or more device orientation sensing elements may include an accelerometer. One or more dedicated processors may be provided in association with the accelerometer to facilitate sensing of signal(s) indicative of the device orientation. Upon identification of the device orientation, an operational parameter such as a volume level of the device may be adjusted in a particular direction based on the device orientation and the particular actuated state of the adjustment element. For example, if the adjustment element is in the first actuated state and the device is determined to be in a first orientation, a value associated with the operational parameter may be adjusted in a first direction (e.g., either increased or decreased). The operational parameter may continue to be increased (or decreased whichever the case may be) as long as the adjustment element is maintained in the first actuated state.

However, if it is detected that the device is repositioned to a second orientation that is different from the first orientation, the electronic device may include computer-executable instructions for associating the first actuated state with an adjustment of the operational parameter in a second direction that is opposite to the first direction that the operational parameter is adjusted in when the device is in the first orientation and the adjustment element is in the first actuated state. As a non-limiting example, assuming that the first actuated state is associated with an increase in an operational parameter (e.g., a volume level) when the device is in the first orientation, the first actuated state would become associated with a decrease in the operational parameter when the device is in the second orientation.

Similarly, in various embodiments of the disclosure, upon application of an external force to a second portion of an adjustment element, the adjustment element may transition to a second actuated state that is different from the first actuated state. In various embodiments, the second actuated state may be associated with a directional adjustment of an operational parameter that is opposite to the directional adjustment of the operational parameter that is associated with the first actuated state. This may be the case regardless of the device orientation. For example, if the first actuated state is associated with an increase in the operational parameter, the second actuated state may be associated with a decrease in the operational parameter and vice versa. However, as described above with respect to the first actuated state, an association between the second actuated state and a particular directional adjustment of the operational parameter may be modified based on a detected orientation of the device. For example, if the device is determined to be in the first orientation, a value associated with the operational parameter may be adjusted in a second direction (e.g., either decreased or increased) when the adjustment element is in the second actuated state. The second direction may be opposite to the directional adjustment associated with the first actuated state of the adjustment element when the device is in the first orientation. The operational parameter may continue to be decreased (or increased whichever the case may be) as long as the adjustment element is maintained in the second actuated state.

However, if it is detected that the device is repositioned to the second orientation that is different from the first orientation, the electronic device may include computer-executable instructions for associating the second actuated state with an adjustment of the operational parameter in the first direction—which is a same direction that the operational parameter is adjusted in when the device is in the first orientation and the adjustment element is in the first actuated state, and which is now opposite to the second direction in which the operational parameter is adjusted when the device is in the second orientation and the adjustment element is in the first actuated state.

As a non-limiting example, assuming that the first actuated state is associated with an increase in an operational parameter (e.g., a volume level) and the second actuated state is associated with a decrease in the operational parameter when the device is in the first orientation, then the first actuated state would become associated with a decrease in the operational parameter and the second actuated state would become associated with an increase in the operational parameter when the device is in the second orientation.

In various embodiments, the associations between actuated states of an adjustment element (e.g., actuation of particular portions of an adjustment element) and respective corresponding directional adjustments of an operational parameter are modified if the change in device orientation between the first orientation and the second orientation exceeds a certain threshold. For example, the first orientation may correspond to any device orientation that falls within a first range of device orientations. Similarly, the second orientation may correspond to any device orientation that falls within a second range of device orientations. The first range of device orientations may be associated with a first range of signal values that may be received from the device orientation sensing elements and the second range of device orientations may be associated with a second range of signal values that may be received from the device orientation sensing elements. Thus, in certain embodiments, the associations between actuated states of an adjustment element and corresponding directional adjustments of an operational parameter controlled by the adjustment element may be not be modified (e.g., reversed) unless a deviation between the first orientation and the second orientation exceeds a threshold deviation. Similarly, associations between device components and functionality provided by the device components may not be modified unless a deviation between the first orientation and the second orientation exceeds a threshold deviation.

Embodiments of the disclosure are applicable to any number of operational parameters beyond volume control such as, for example, a magnification or zoom level associated with an image capturing device that is capable of capturing still images and/or recording video, one or more display parameters associated with a display of the device such as a brightness level, a contrast level, a tint level, or any other suitable operational parameter. In particular, an association between actuation of a particular portion of an adjustment element for adjusting an operational parameter and a direction in which the operational parameter is adjusted upon detection of the actuation may be modified based on a detected change in the orientation of the device for any suitable operational parameter.

In various embodiments of the disclosure, the adjustment element may be a softkey that is flexibly programmed to enable adjustment of a variety of different operational parameters. The particular operational parameter that may be controlled by the adjustment element at a particular instance may be determined based on one or more device settings. For example, a user of the device may be provided with a capability to select via a user interface, for example, a desired operational parameter for adjustment using the adjustment element from among the variety of operational parameters that may be potentially controlled by the adjustment element. Alternatively, or additionally, the particular operational parameter that is controlled by a softkey adjustment element may be determined based on a predefined association with an application currently being executed on the device. As a non-limiting example, a device may have an image capturing device associated therewith. When an application for controlling the image capturing device (e.g., a dedicated mobile application) is being executed on the device, the adjustment element may become disassociated with a particular operational parameter (e.g., a volume level) and may become associated with a different operational parameter related to the application being executed (e.g., a magnification level) such that the different operational parameter may be controlled via the adjustment element.

In one or more embodiments of the disclosure, device functionality may be modified in a variety of other ways based on a change in device orientation. As previously discussed, associations between device components and functionality supported by the device components may be modified based on a change in device orientation in order to, for example, maintain a directionality associated with information output from the device (e.g., sound output). In other illustrative embodiments, a switch may be disabled when a device is oriented in certain orientations such that the switch, even if actuated, is not enabled to cause associated device functionality to be performed when the device is oriented in those orientations. Alternatively, rather than disabling a switch in certain orientations, modified actions may need to be taken in order to actuate the switch and enable the associated functionality to be performed. As a non-limiting example, in the case of a switch that upon actuation causes a particular user interface of a device (e.g., a home screen) to be presented on a display of the device, an external force may need to be applied to the switch for a longer duration in certain device orientations in order to actuate the switch and enable the associated functionality to be performed.

The embodiments described above as well as additional embodiments of the disclosure will be described in greater detail through reference to the accompanying drawings.

Illustrative Architecture and Illustrative Use Cases

FIG. 2 schematically depicts an illustrative electronic device 200 in accordance with one or more embodiments of the disclosure. The illustrative device may be any suitable device including, but not limited to, a tablet device such as a mobile tablet device with voice and/or data capabilities, a mobile device such as a smartphone or other cellular device with voice and/or data capabilities, a personal digital assistant (PDA), a gaming console, a gaming controller, a device capable of recording or playing audio and/or video content, or any other suitable device.

The device may include a display panel 204 that is seated within a chassis 202 of the device 200. The display panel 204 may be configured to render textual content, graphical content, video content, and so forth. The device 200 may further include one or more processors (processor(s)) 206 and one or more memories 208 (hereinafter collectively or individually referred to as memory 208). The processor(s) 206 may include any suitable processing unit capable of accepting digital data as input, processing the input data based on stored computer-executable instructions, and generating output data. The computer-executable instructions may be stored, for example, in the memory 208 and may include operating system software, application software, program modules, and so forth. The processor(s) 206 may be configured to execute the computer-executable instructions to cause various operations to be performed. The processor(s) 206 may include any type of processing unit including, but not limited to, a central processing unit, a microprocessor, a microcontroller, a Reduced Instruction Set Computer (RISC) microprocessor, an Application Specific Integrated Circuit (ASIC), a System-on-a-Chip (SoC), a field-programmable gate array (FPGA), and so forth.

The memory 208 may store program instructions that are loadable and executable by the processor(s) 206, as well as data manipulated and generated by the processor(s) 206 during execution of the program instructions. Depending on the configuration and implementation of the device 200, the memory 208 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 208 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The device 200 may further include additional data storage 212 such as removable storage and/or non-removable storage including, but not limited to, magnetic storage, optical disk storage, and/or tape storage. Data storage 212 may provide non-volatile storage of computer-executable instructions and other data. The memory 208 and/or the data storage 212, removable and/or non-removable, are examples of computer-readable storage media (CRSM).

The device 200 may further include network interface(s) 214 that allow the device 200 to communicate with other devices or application software via one or more networks such as cellular voice and/or data networks, metropolitan-area networks (MANs), wide-area networks (WANs), local area networks (LANs), the Internet, private networks, and so forth. The device 200 may additionally include one or more input/output (I/O) interfaces 210 (and optionally associated software components such as device drivers) that may support various I/O devices, such as a keyboard, a mouse, a pen, a voice input device, a touch input device, a display, speakers, a camera, a microphone, a printer, and so forth, for receiving user input and/or providing output to a user.

The device 200 may further include various other hardware component(s) and associated software component(s). For example, the device 200 may include one or more sensing devices 216 for sensing one or more parameters associated with operation of the device 200. One or more dedicated processors (e.g., any one or more of the processor(s) 206) may be associated with the sensing device(s) 216. As a non-limiting example, the sensing device(s) 216 may include an accelerometer (e.g., a multi-axis accelerometer) configured to sense forces along one or more reference axes due to acceleration of the device 200 and generate signal(s) indicative thereof. The signals may be processed by the device 200 to determine an orientation of the device with respect to the one or more reference axes. As another non-limiting example, the sensing device(s) 216 may include a temperature sensor for sensing internal temperature fluctuations. It should be appreciated that the above examples are merely illustrative and that the device 200 may include any number of various types of sensing devices capable of generating signals indicative of sensed parameter(s). The device 200 may further include any number of additional hardware and/or software components not depicted in FIG. 2.

Referring again to the memory 208, various modules may be stored therein that may comprise computer-executable instructions that when executed by the processor(s) 206 cause various operations to be performed. For example, the memory 208 may have loaded therein an operating system (0/S) 218 that provides an interface between other application software (e.g., dedicated applications, a browser application, a web-based application, etc.) executing on the device 200 and hardware resources of the device 200. More specifically, the O/S 218 may include a set of computer-executable instructions for managing hardware resources of the device 200 and for providing common services to other application programs (e.g., managing memory allocation among various application programs). The O/S 218 may include any operating system now known or which may be developed in the future including, but not limited to, any mobile operating system, any desktop operating system, any mainframe operating system, or any other proprietary or open-source operating system.

The memory 208 may additionally include various other program modules that may provide various associated functionality. For example, the memory 208 may include a device orientation determination module 220, an actuation detection module 222, an operational parameter identification module 224, and an operational parameter control modification module 226. The various functionalities provided by these modules will be described in more detail through reference to other accompanying drawings of this disclosure.

It should be appreciated that each of the above-mentioned modules may, in various embodiments, represent a logical partitioning of functionality supported by the device. This logical partitioning is depicted for ease of explanation of the functionality supported and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality.

FIGS. 3A-3F schematically depict an illustrative use case that involves adjustment of an illustrative operational parameter associated with an electronic device when the device is positioned in different device orientations in accordance with one or more embodiments of the disclosure. In particular, FIGS. 3A-3C schematically depict volume level adjustment for an electronic device 300 when the device 300 is positioned in a first orientation. FIGS. 3D-3F schematically depict volume level adjustment when the device 300 is positioned in a second orientation that is different from the first orientation. While the "first orientation" is illustratively depicted as a landscape orientation and the "second orientation" is illustratively depicted as a portrait orientation, it should be appreciated that the first and second orientations may correspond to any suitable orientations. For example, in certain embodiments, the second orientation may correspond to rotation of the device by 180 degrees from the first orientation.

Figures 3G, 3H, 3I, 3J, 3K, 3L:
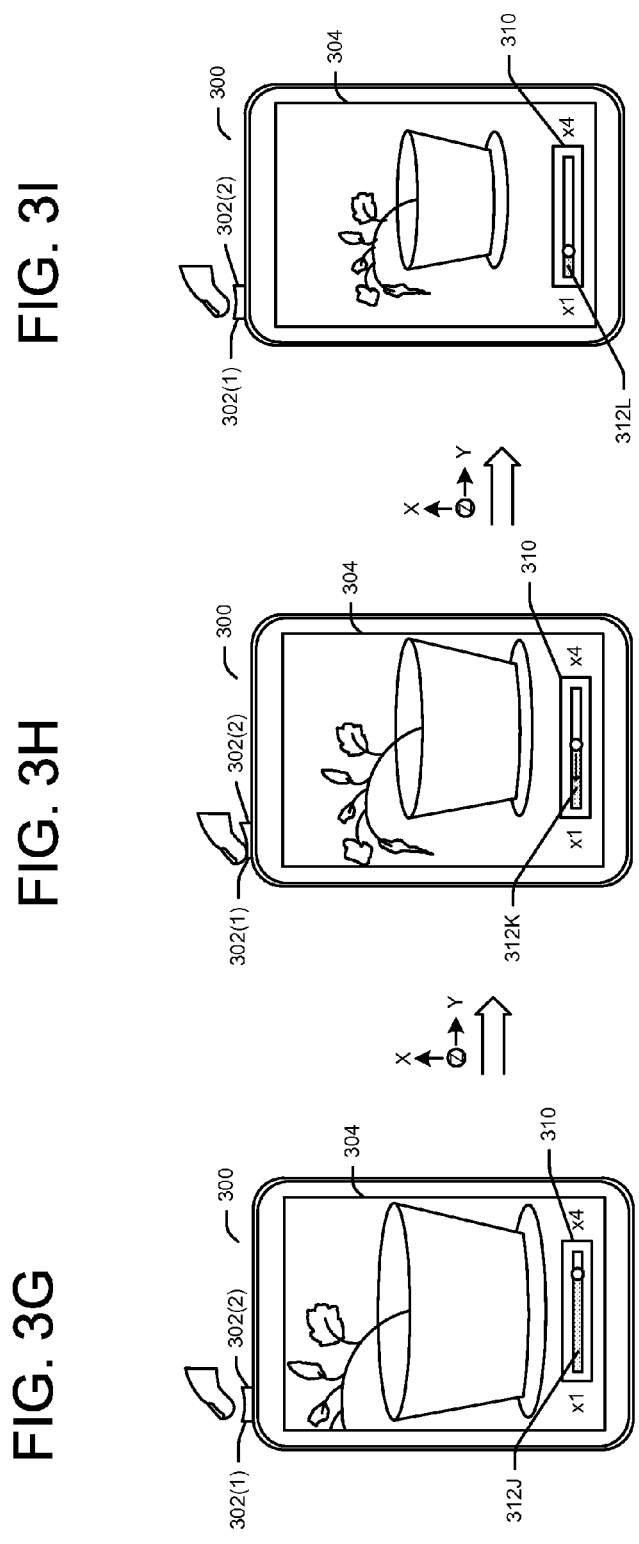
FIGS. 3G-3I schematically depict an illustrative use case that involves adjustment of another illustrative operational parameter of an electronic device when the device is positioned in a first orientation in accordance with one or more additional embodiments of the disclosure.
FIGS. 3J-3L schematically depict an illustrative use case that involves adjustment of the illustrative operational parameter of the electronic device depicted in FIGS. 3G-3I when the device is positioned in a second orientation that is different from the first orientation in accordance with one or more embodiments of the disclosure.

FIGS. 3G-3L schematically depict an illustrative use case that involves adjustment of another illustrative parameter associated with a device when the device is positioned in different device orientations in accordance with one or more embodiments of the disclosure. FIGS. 3G-3I schematically depict adjustment of a level of magnification associated with an image capturing device provided as part of the device 300 (which may also be referred to herein as a zoom level) when the device 300 is positioned in the first orientation. FIGS. 3J-3L schematically depict a zoom level adjustment when the device 300 is positioned in the second orientation. In various embodiments, the device 300 may have the illustrative device architecture of the device 200. The use case depicted in FIGS. 3A-3F as well as the use case depicted in FIGS. 3G-3L will each be described through reference to the illustrative device architecture depicted in FIG. 2.

As depicted in FIGS. 3A-3F and in FIGS. 3G-3L, and in accordance with one or more embodiments of the disclosure, the manner in which an operational parameter may be adjusted via operation of an adjustment element that enables adjustment of the operational parameter may be dynamically modified based on a change in the orientation of the device. While a rocker switch is illustratively shown in FIGS. 3A-3L, the following discussion regarding the operation of electronic devices in accordance with embodiments of the disclosure is applicable to any type of adjustment element that may enable adjustment of an operational parameter (e.g., a rocker switch, a rotary switch, a set of multiple push-button switches, etc.). Further, while the switch illustratively depicted in FIGS. 3A-3L has been provided on a side of the device 300 that extends in a direction identified as an x-axis direction, it should be appreciated that the switch may be provided in a variety of alternate locations in accordance with various other embodiments of the disclosure.

Referring to FIG. 3A, the device 300 is shown as being oriented in a first orientation (e.g., a landscape orientation) with respect to a set of reference axes. The illustrative device 300 may include a display panel 304 configured to display content. An adjustment element 302 may be provided as part of the device 300. The adjustment element 302 is illustratively depicted as a rocker switch but may include any one or more switches or buttons such as, for example, a rotary switch, a set of multiple push-button switches, and so forth. The adjustment element 302 may be configured to enable an operational parameter to be adjusted. In FIGS. 3A-3F, the illustrative operational parameter shown as being adjustable using the adjustment element 302 is a volume level of the device. However, as will be described in more detail through reference to FIGS. 3G-3L, other suitable operational parameters may be adjustable using the adjustment element 302 in various other embodiments.

The adjustment element 302 may include a first portion 302(1) and a second portion 302(2). Application of an external force to the first portion 302(1) of the adjustment element 302 (e.g., actuation of the first portion 302(1)) may cause the adjustment element 302 to transition to a first actuated state while application of an external force to the second portion 302(2) of the adjustment element 302 (e.g., actuation of the second portion 302(2)) may cause the adjustment element 302 to transition to a second actuated state. In those embodiments in which the adjustment element 302 includes multiple switches or buttons that together enable adjustment of an operational parameter associated with the device 300, the first portion 302(1) of the adjustment element 302 may refer to a first switch or button and the second portion 302(2) of the adjustment element 302 may refer to a second switch or button.

In accordance with embodiments of the disclosure, when the device 300 is oriented in a first orientation (which may include a range of device orientations), the first actuated state may be associated with a first directional adjustment in an operational parameter and the second actuated state may be associated with a second directional adjustment of the operational parameter. The first directional adjustment and the second directional adjustment may be opposing. For example, the first directional adjustment may correspond to an increase in a value associated with the operational parameter (e.g., an increase in a volume level of the device 300) and the second directional adjustment may correspond to a decrease in the value associated with the operational parameter (e.g., a decrease in the volume level of the device 300) or vice versa. When the device is oriented in a second orientation that is different from the first orientation (which may include a range of device orientations that is distinct from a range of device orientations associated with the first orientation), the associations between the directional adjustments of the operational parameter and the actuated states may be reversed. More particularly, when the device is oriented in the second orientation, the first actuated state may become associated with the second directional adjustment of the operational parameter and the first actuated state may become associated with the first directional adjustment.

Referring to FIGS. 3A-3F, the device 300 may be configured to present an indicator 306 of a current volume level of the device via the display panel 304. In FIG. 3A, the indicator 306 provides an indication 308A of an illustrative initial volume level of the device 300. In FIG. 3B, an external force is shown as being applied by, for example, a user of the device 300 to the first portion 302(1) of the adjustment element 302. Upon application of the external force to the first portion 302(1) of the adjustment element 302, the adjustment element 302 may transition to the first actuated state. Further, upon application of an external force to the second portion 302(2) of the adjustment element 302, the adjustment element 302 may transition to a second actuated state (not shown with respect to the first orientation depicted in FIGS. 3A-3C). The adjustment element 302 may be detected to be in the first actuated state or the second actuated state upon execution of computer-executable instructions that may be provided, for example, as part of the actuation detection module 222. For example, the processor(s) 206 may be configured to execute computer-executable instructions provided as part of the actuation detection module 222 to determine that the adjustment element 302 is in the first actuated state or the second actuated state by identifying and processing electrical signal(s) generated as a result of application of the force to the first portion 302(1) or the second portion 302(2), respectively.

The device 300 is depicted as being oriented in a first orientation in FIGS. 3A-3C. The processor(s) 206 may be configured to execute computer-executable instructions provided as part of, for example, the device orientation determination module 220 to determine an orientation of the device 300. More specifically, the sensing device(s) 216 may include one or more device orientation sensing elements (e.g., an accelerometer). The device orientation sensing elements may include, for example, a Micro Electro-Mechanical Systems (MEMS) accelerometer configured to sense forces due to acceleration and may be used to sense a tilt or orientation of the device 300 with respect to a reference plane. The device orientation sensing elements may be configured to generate analog output signal(s) (e.g., a continuous voltage) or digital output signal(s) (e.g. a pulse width modulated voltage signal) having a known proportionality to acceleration. The device orientation determination module 220 may include computer-executable instructions for receiving the output signal(s), analyzing the signals, and determining an orientation of the device 300 based on the analysis. In accordance with one or more embodiments, the orientation of the device 300 may be determined at periodic intervals and/or upon detection of movement of the device 300. In certain embodiments, the orientation of the device 300 may be determined prior to detection that the adjustment element 302 is in an actuated state. In other embodiments, the orientation of the device 300 may be determined in response to detection that the adjustment element 302 is in an actuated state.

In various embodiments, if the device 300 is determined to be oriented in the first orientation (e.g., the device orientation depicted in FIGS. 3A-3C), actuation of the first portion 302(1) of the adjustment element 302 may be associated with a first directional adjustment of an operational parameter and actuation of the second portion 302(2) of the adjustment element 302 may be associated with a second directional adjustment of the operational parameter opposite to the first directional adjustment. The processor(s) 206 may be configured to execute computer-executable instructions provided as part of, for example, the operational parameter control modification module 226 to associate the first directional adjustment with actuation of the first portion 302(1) of the adjustment element 302 when the device 300 is oriented in the first orientation and adjust the operational parameter accordingly. Similarly, the processor(s) 206 may be configured to execute computer-executable instructions provided as part of the operational parameter control modification module 226 to associate the second directional adjustment with actuation of the second portion 302(2) of the adjustment element 302 when the device 300 is oriented in the first orientation and adjust the operational parameter accordingly. As a non-limiting example, the first directional adjustment may correspond to an increase in the volume level associated with the device 300 and the second directional adjustment may correspond to a decrease in the volume level associated with the device 300, or vice versa.

As schematically depicted in FIG. 3B, the indicator 306 may provide an indication 308B of an instantaneous volume level of the device 300. As long as the adjustment element 302 is maintained in the first actuated state while the device 300 is oriented in the first orientation, the indication 308B may dynamically change in a manner that reflects adjustment of the volume level in accordance with the first directional adjustment (e.g., an increase in the volume level). FIG. 3C depicts a device state in which the external force is removed from the first portion 302(1) of the adjustment element 302 and the adjustment element 302 is permitted to transition from the first actuated state to a non-actuated state. The indicator 306 provides an indication 308C of the current volume level which has been increased from the initial volume level schematically depicted in FIG. 3A as a result of the external force schematically depicted as being applied to the first portion 302(1) of the adjustment element 302 in FIG. 3B.

Referring now to FIG. 3D, the device 300 is shown as being oriented in a second orientation (e.g., a portrait orientation) that is different from the first orientation depicted in FIGS. 3A-3C. In FIG. 3D, the indicator 306 provides an indication 308D of an illustrative initial volume level of the device 300 when the adjustment element 302 is in a non-actuated state. In FIG. 3E, an external force is shown as being applied to the second portion 302(2) of the adjustment element 302. As described earlier, upon application of the external force to the second portion 302(2) of the adjustment element 302, the adjustment element 302 may transition to the second actuated state. The adjustment element 302 may be detected to be in the second actuated state upon execution of computer-executable instructions provided as part of the actuation detection module 222.

As previously described with respect to the first orientation depicted in FIGS. 3A-3C, the device 300 may be determined to be positioned in the second orientation depicted in FIGS. 3D-3F upon execution of computer-executable instructions provided as part of the device orientation determination module 220. The device may be determined to be in the second orientation prior to, upon, or subsequent to detection that the adjustment element 302 is in the second actuated state. In accordance with embodiments of the disclosure, upon determining that the device is oriented in the second orientation, computer-executable instructions provided as part of the operational parameter control modification module 226 may be executed to associate actuation of the second portion 302 (2) of the adjustment element 302 with a directional adjustment of the operational parameter that is opposite to the directional adjustment associated with actuation of the second portion 302(2) when the device is oriented in the first orientation.

As a non-limiting example, in the illustrative use case depicted in FIGS. 3A-3C, actuation of the second portion 302(2) of the adjustment element 302 (e.g., the second actuated state) is associated with a decrease in the volume level when the device is oriented in the first orientation. Accordingly, if the device is repositioned from the first orientation to the second orientation depicted in FIGS. 3D-3F, computer-executable instructions provided as part of the operational parameter control modification module 226 may be executed to disassociate actuation of the second portion 302(2) from a decrease in the volume level and instead associate actuation of the second portion 302(2) with an increase in the volume level. As such, when the second portion 302(2) of the adjustment element 302 is actuated and the device is oriented in the second orientation, the volume level is increased as depicted in FIG. 3E. As schematically depicted in FIG. 3E, the indicator 306 may provide an indication 308E of an instantaneous volume level of the device 300 that dynamically changes in a manner that reflects the increase in the volume level. FIG. 3F depicts a device state in which the external force is removed from the second portion 302(2) of the adjustment element 302 and the adjustment element 302 is permitted to transition once again to a non-actuated state. The indicator 306 provides an indication 308F of the current volume level which has been increased from the initial volume level schematically depicted in FIG. 3D as a result of the external force that was applied to maintain the adjustment element 302 in the second actuated state.

Further, although not depicted in FIGS. 3D-3F, functionality associated with actuation of the first portion 302(1) of the adjustment element 302 may also be modified (e.g., reversed) based on an orientation of the device 300. For example, when the device is positioned in the first orientation depicted in FIGS. 3A-3C, actuation of the first portion 302(1) may be associated with an increase in the operational parameter (e.g., volume level). Conversely, when the device is positioned in the second orientation depicted in FIGS. 3D-3F, actuation of the first portion 302(1) may be associated with a decrease in the operational parameter (e.g., volume level).

While FIGS. 3A-3F depict a use case involving a particular illustrative operational parameter (volume level), it should be appreciated that embodiments of the disclosure are applicable to any of a variety of operational parameters that may be adjusted via an adjustment element associated with the device. In certain embodiments, the adjustment element may be one or more dedicated switches or buttons enabled to control a single operational parameter. For example, multiple sets of one or more adjustment elements may be provided with each set dedicated to enabling adjustment of a particular operational parameter.

However, in other embodiments, the adjustment element may be flexibly programmed to enable adjustment of any of a variety of operational parameters. FIGS. 3G-3L schematically depict an illustrative use case that involves adjustment of a zoom level parameter with respect to different device orientations. In various embodiments, the adjustment element 302 may be a softkey switch that is capable of being flexibly programmed to enable adjustment of additional operational parameters beyond volume level such as, for example, zoom level. The operational parameter whose adjustment is enabled by the softkey switch may be determined based on one or more device settings. For example, a user of the device 300 may be provided with a capability to select—via a user interface of the device 300—a desired operational parameter for adjustment from among a variety of operational parameters that may be potentially controlled by the adjustment element 302.

Alternatively, or additionally, the particular operational parameter that is controlled by the adjustment element 302 may be determined based on a predefined association with an application currently being executed on the device. For example, in embodiments of the disclosure associated with the use case depicted in FIGS. 3G-3L, the adjustment element 302 may be configured to enable adjustment of a zoom level rather than the volume level upon execution by the device 300 of an application stored therein and based on a predefined association between the zoom level parameter and the application. The application may be, for example, a dedicated application of the device 300 that provides a user with the capability to access and control functionality associated with an image capturing device provided as part of the device 300. Computer-executable instructions provided as part of, for example, the operational parameter identification module 224 may be executed to identify the operational parameter to associate with a softkey that is capable of enabling adjustment of multiple operational parameters.

FIGS. 3G-3I depict an illustrative adjustment of a zoom level when the device 300 is in a first orientation. Similar to FIGS. 3A-3C, the adjustment element 302 is depicted as being in a non-actuated state in FIG. 3G. A zoom level indicator 310 indicates an initial illustrative zoom level 312G. As depicted in FIG. 3H, responsive to actuation of the first portion 302(1) of the adjustment element 302, the adjustment element 302 may transition to a first actuated state, and based on a determination that the device is oriented in the first orientation the zoom level may be adjusted in a particular direction. For example, the zoom level may be increased in such a scenario as schematically depicted by the indication 312H of the zoom level shown in FIG. 3H. Along similar lines, responsive to actuation of the second portion 302(2) of the adjustment element 302, the adjustment element 302 may transition to a second actuated state, and based on the determination that the device is oriented in the first orientation, the zoom level may be adjusted in an opposing direction as compared to the first actuated state. FIG. 3I depicts a device state in which the external force is removed from the first portion 302(1) of the adjustment element 302 such that the adjustment element 302 is no longer being maintained in the first actuated state. The indicator 310 provides an indication 312I of the current zoom level which has increased from the initial zoom level associated with the device state depicted in FIG. 3G.

FIGS. 3J-3L depict the device 300 as being oriented in a second orientation different from the device orientation shown in FIGS. 3G-3I. Based on the device 300 being oriented in the second orientation, the associations between the actuated states of the adjustment element 302 and the corresponding directions in which the zoom level may be adjusted may be reversed such when the device is in the first orientation, the first actuated state is associated with an increase in the zoom level and when the device is in the second orientation, the second actuated state is associated with the increase in the zoom level. For example, indication 312J of an initial zoom level of the device is shown in FIG. 3J. Upon actuation of the first portion 302(1) of the adjustment element 302, the adjustment element 302 may transition to the first actuated state which, in the case of the second device orientation, may be associated with a decrease in the zoom level. As long as the adjustment element 302 is maintained in the first actuated state, the zoom level may be adjusted in accordance with the directional adjustment associated with first actuated state in the second device orientation (e.g., decreased). An indication 312L of the decreased zoom level associated with the device 300 when the first portion 302(1) of the adjustment element 302 is no longer actuated is depicted in FIG. 3L.

A device and associated device components in accordance with embodiments of the disclosure enable modification of device functionality based on an orientation of the device. In certain embodiments, a direction in which an operational parameter is adjusted upon actuation of a particular portion of an adjustment element may be modified (e.g., reversed) depending on a determined orientation of the device. In other embodiments, associations between device components and functionality that they support may be modified (e.g., reversed) based on a change in device orientation such that, for example, a directionality associated with an operational parameter (e.g., sound output) is maintained. In this manner, devices in accordance with embodiments of the disclosure provide a more intuitive user experience than conventional devices.

For example, the adjustment element 302 is illustratively depicted in FIGS. 3A-3L as being provided on a side surface of the device 300 that extends along a reference x-axis. The device 300 may have a set of natural orientations associated therewith that correspond to the typical ways in which a user may position the device 300 during use. Such "natural" orientations may include the first orientation and the second orientation of the device described throughout. In certain embodiments, the first orientation may correspond to an orientation (or a range of orientations) of the device 300 in which the adjustment element 302 is positioned on a side surface of the device 300 that extends in the x-axis direction. In the first orientation, the adjustment element 302 may be provided proximal to a side surface of the device 300 that extends along the y-axis direction and which is more distal from the user than an opposing side surface. Along similar lines, in certain embodiments, the second orientation may correspond to a device orientation in which the side surface along which the adjustment element 302 is positioned is located most distal from the user of the device 300.

Accordingly, when the device is in the first orientation, it is intuitive for a user to expect that upon actuation of the first portion 302(1) of the adjustment element 302, an operational parameter controlled by the adjustment element 302 will be increased and that upon actuation of the second portion 302(2) of the adjustment element 302, an operational parameter controlled by the adjustment element 302 will be decreased. In contrast, when the device is in the second orientation, it is intuitive for a user to expect the opposite—that upon actuation of the second portion 302(2) of the adjustment element 302, an operational parameter controlled by the adjustment element 302 will be increased and that upon actuation of the first portion 302(1) of the adjustment element 302, an operational parameter controlled by the adjustment element 302 will be decreased.

In conventional devices, this intuitive expectation is not satisfied when the devices are rotated from, for example, a landscape orientation to a portrait orientation. However, embodiments of the disclosure are capable of meeting this expectation regardless of device orientation. In particular, by associating—based on device orientation—a directional adjustment of an operational parameter with actuation of a particular portion of an adjustment element for controlling adjustment of that parameter (e.g., a particular actuated state of the adjustment element), the manner in which the adjustment element is operated to enable adjustment of the operational parameter remains intuitive to the user of the device regardless of device orientation.

In addition, in conventional devices, associations between device components and functionality they support are unchanged despite a change in device orientation. For example, in a conventional device provided with stereophonic capabilities, a particular speaker is associated with a particular audio channel regardless of device orientation. As such, if the orientation of such a conventional device is reversed, a directionality associated with output information is reversed as well. In contrast, devices in accordance with certain embodiments of the disclosure are more intuitive because if a device orientation is modified by a threshold amount (e.g., rotated 180 degrees), the associations between speakers and audio channels are reversed so that a directionality associated with the output information is maintained.

Illustrative Processes

Figure 4:
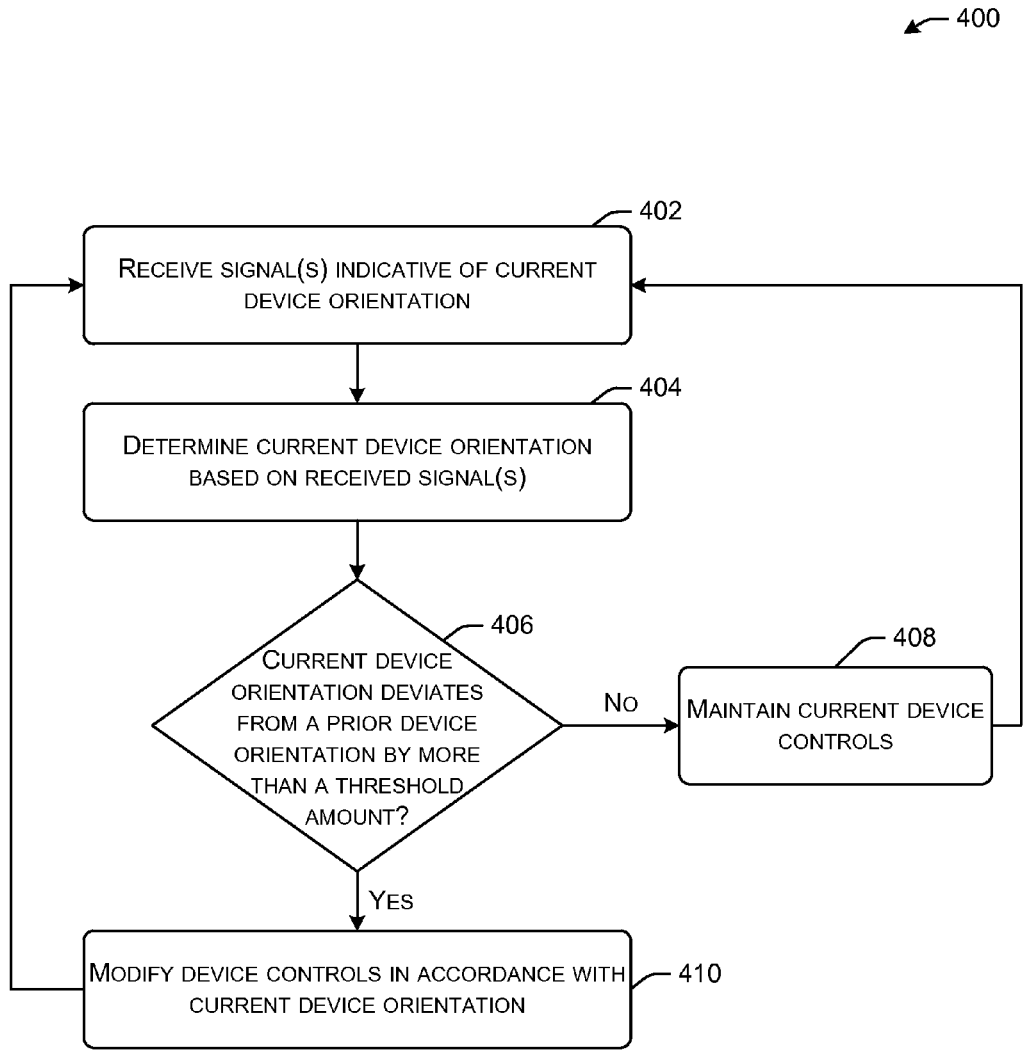
FIG. 4 is a process flow diagram of an illustrative method for modifying device functionality based at least in part on an orientation of a device in accordance with one or more embodiments of the disclosure.

FIG. 4 is a process flow diagram of an illustrative method 400 for modifying device functionality based at least in part on an orientation of a device in accordance with one or more embodiments of the disclosure. One or more operations of the method 400 may be performed by one or more components of the illustrative device 200.

At block 402, one or more signals indicative of a current orientation of a device may be received. The signal(s) may be received by, for example, the device orientation determination module 220 from one or more device orientation sensing elements.

At block 404, a current orientation of the device may be determined based on the received signal(s). For example, computer-executable instructions provided as part of the device orientation determination module 220 may be executed to analyze the received signal(s) and determine the current device orientation.

At decision block 406, a determination may be made as to whether the current device orientation deviates from a prior device orientation by more than a threshold amount. If it is determined that the current device orientation differs from the prior device orientation by more than the threshold amount, the method 400 may proceed to block 410 where the device controls may be modified in accordance with the current device orientation. As a non-limiting example, the current device orientation may correspond to the second orientation previously described and the prior orientation may correspond to the first orientation (or vice versa). As another non-limiting example, the first orientation may correspond to an initial landscape or portrait orientation and the second orientation may correspond to a device orientation obtained by rotating the device from the initial orientation by 180 degrees. In such a scenario, an affirmative determination may be made at block 406 and associations between actuation of particular portions of an adjustment element and particular directional adjustments of an operational parameter controlled by the adjustment element may be modified. Alternatively, or additionally, an affirmative determination may be made at block 406 and associations between device components (e.g., stereo speakers) and functionality they support (e.g., output from a particular audio channel) may be modified (e.g., reversed).

On the other hand, if it is determined at block 406 that the current device orientation does not deviate from the prior device orientation by more than the threshold amount, then the method 400 may proceed to block 408 where the current device controls may be maintained. For example, if the prior device orientation corresponds to the first orientation and the current device orientation corresponds to the first orientation as well (or an otherwise intermediate orientation between the first orientation and the second orientation that does not deviate from the first orientation by more than the threshold amount), the current device controls (e.g., current associations between actuated states of an adjustment element and directional adjustments of an operational parameter controlled by the adjustment element, current associations between particular stereo speakers and particular audio channels, etc.) may be maintained.

Figure 5:
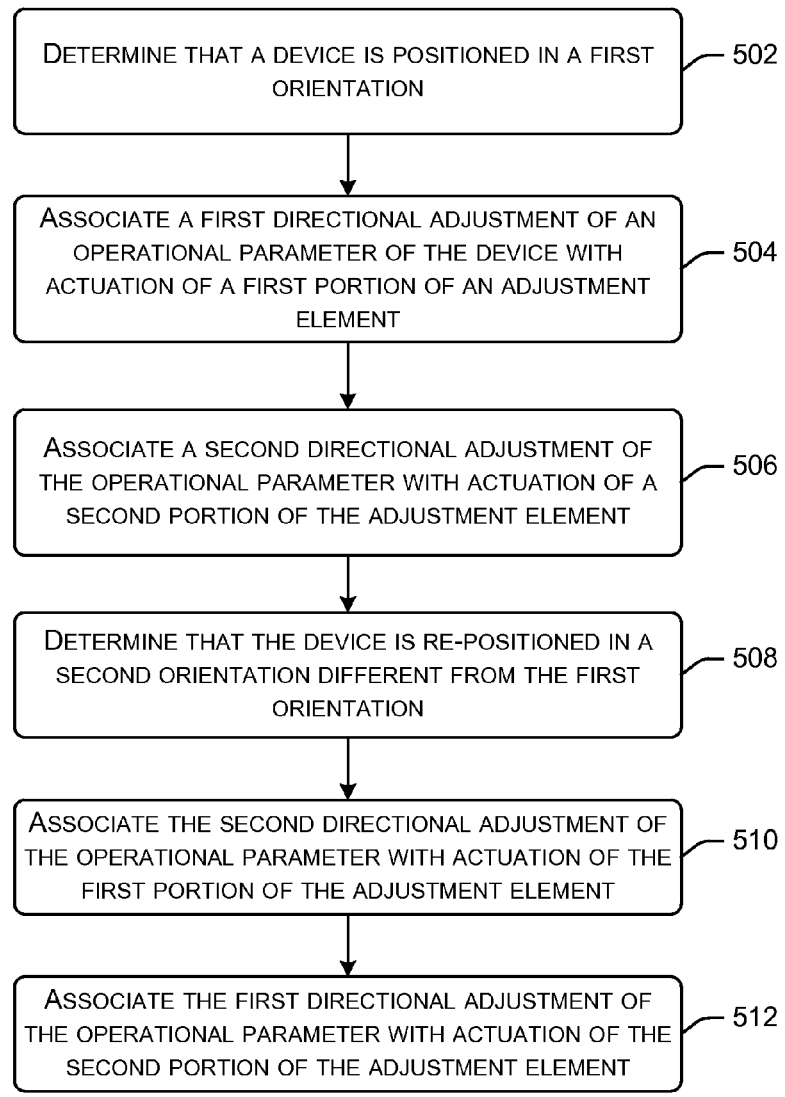
FIG. 5 is a process flow diagram of an illustrative method for modifying functionality associated with the adjustment of operational parameter(s) associated with an electronic device based at least in part on an orientation of the device in accordance with one or more embodiments of the disclosure.

FIG. 5 is a process flow diagram of an illustrative method 500 for modifying functionality associated with the adjustment of operational parameter(s) associated with an electronic device based at least in part on an orientation of a device in accordance with one or more embodiments of the disclosure. One or more operations of the method 500 may be performed by one or more components of the illustrative device 200.

At block 502, a determination may be made that a device is positioned in a first orientation. In various embodiments, the first orientation may correspond to any device orientation within a first range of device orientations.

At block 504, a first directional adjustment of an operational parameter associated with the device may be associated—based on the determination that the device is oriented in the first orientation—with actuation of a first portion of an adjustment element that enables adjustment of the operational parameter. The first directional adjustment may correspond to an increase or a decrease in a value associated with the operational parameter.

At block 506, a second directional adjustment of the operational parameter may be associated with actuation of a second portion of the adjustment element based on the determination that the device is oriented in the first orientation. The second directional adjustment may correspond to a directional adjustment to the operational parameter that is opposite to the first directional adjustment.

At block 508, a determination may be made that the device has been re-positioned in a second orientation different from the first orientation. In certain embodiments, the second orientation may deviate from the first orientation by more than a threshold amount.

Blocks 510 and 512 may represent a reversal—based on the determination that the device is now positioned in the second orientation—of the associations between actuation of particular portions of the adjustment element and directional adjustments of the operational parameter that are made at blocks 504 and 506. More specifically, at block 510, the second directional adjustment of the operational parameter may be associated with actuation of the first portion of the adjustment element and, at block 512, the first directional adjustment of the operational parameter may be associated with actuation of the second portion of the adjustment element. Although not depicted in FIG. 5, the method 500 may further include, in various embodiments, detecting actuation of a particular portion of the adjustment element (e.g., the first portion or the second portion) and adjusting the operational parameter in accordance with a particular directional adjustment based on the current device orientation.

Figure 6A:
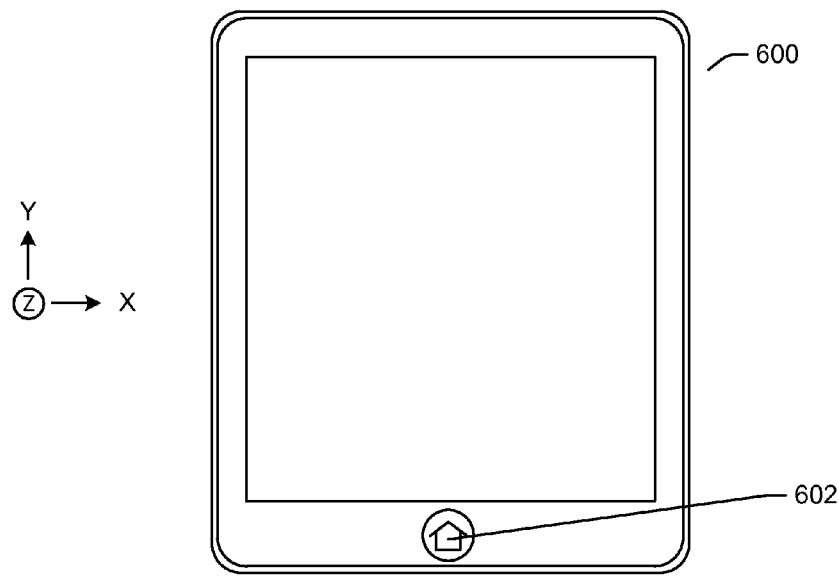
FIGS. 6A-6B schematically depict another illustrative use case in which device controls are modified based on an orientation of a device in accordance with one or more embodiments of the disclosure.
Figure 6B:
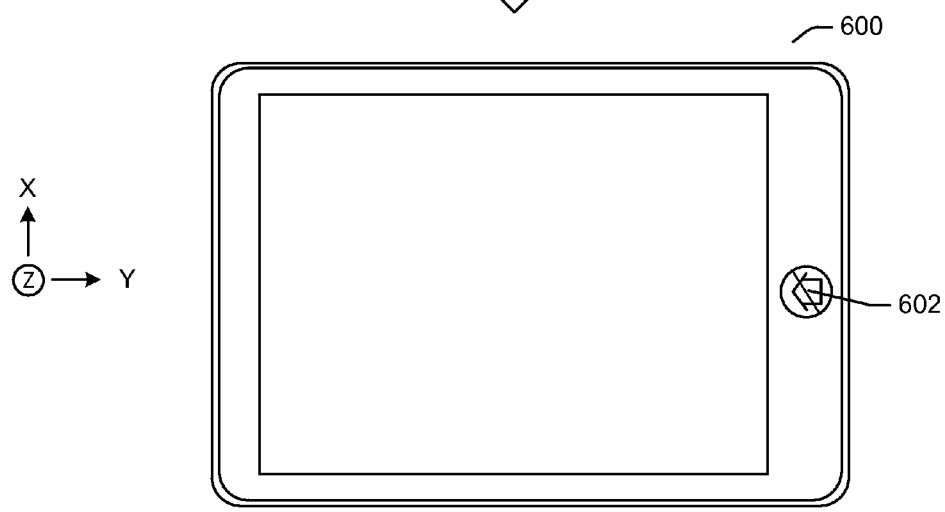

FIGS. 6A-6B schematically depict another illustrative use case in which device controls are modified based on an orientation of a device 600 in accordance with one or more embodiments of the disclosure. In FIG. 6A, the device 600 is depicted in a prior orientation. In FIG. 6B, the device 600 is depicted as being re-positioned from the prior orientation to a subsequent orientation.

Various device controls or functionality made be altered based on a change from the device orientation depicted in FIG. 6A to the device orientation depicted in FIG. 6B. For example, a button 602 (e.g., a "home" button or the like) that is enabled in the device orientation of FIG. 6A may become disabled in the device orientation of FIG. 6B. Alternatively, rather than becoming disabled, modified actions may need to be taken in order to actuate the button 602 in the device orientation of FIG. 6B and enable the associated functionality to be performed. As a non-limiting example, in the case where actuation of the button 602 causes a particular user interface of a device (e.g., a home screen) to be presented on a display of the device or an application to be exited or closed, an external force may need to be applied to the button 602 for a longer duration in order to actuate the button 602 and enable the associated functionality to be performed. In various embodiments, this may prevent inadvertent interruption of executing applications. It should be appreciated that the above examples are merely illustrative and that any suitable device functionality may be modified in any suitable manner based on a detected device orientation. For example, in various embodiments, associations between device components (e.g., stereo speakers) and functionality they support (e.g., sound output on a particular audio channel) may be modified (e.g., each speaker may become associated with a different audio channel) based on a change in device orientation such as rotation of the device 180 degrees from an initial orientation. The initial orientation may correspond, for example, to any orientation within a predefined range of orientations that includes a portrait orientation or to any orientation within a predefined range of orientations that includes the landscape orientation.

It should be appreciated that modifiers such as "first" and "second" are used herein for ease of explanation of the relationship between actuation of various portions of an adjustment element for adjusting an operational parameter associated with an electronic device, directional adjustments of the operational parameter, device functionality and device orientations. The use of such modifiers is not intended to limit the scope of embodiments of the disclosure in any way.

Further, while illustrative techniques and methodologies for modifying device controls or functionality based on device orientation have been described with respect to the illustrative device architecture of FIG. 2, the illustrative use cases depicted in FIGS. 3A-3L and FIGS. 6A-6B, and the illustrative processes of FIGS. 4 and 5, it should be appreciated that numerous other configurations are possible for implementing the illustrative techniques and methodologies disclosed herein. Accordingly, embodiments of the disclosure are not limited to any particular architectural configuration or implementation. Further, embodiments of the disclosure are applicable to a broad range of use cases beyond the specific ones described herein.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations have been described, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to illustrative embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. One or more non-transitory computer-readable media comprising computer-executable instructions that responsive to execution by at least one processor configure the at least one processor to perform operations comprising:
   determining that an electronic device is positioned in a first orientation, wherein the electronic device comprises an adjustment element for adjusting a volume level associated with the electronic device;
   based at least in part on determining that the electronic device is positioned in the first orientation, increasing the volume level responsive to actuation of a first portion of the adjustment element and decreasing the volume level responsive to actuation of a second portion of the adjustment element;
   determining that the electronic device is repositioned from the first orientation to a second orientation that is different from the first orientation; and
   reversing respective functions associated with the first portion and the second portion of the adjustment element based at least in part on determining that the electronic device is positioned in the second orientation, wherein reversing the respective functions comprises decreasing the volume level responsive to actuation of the first portion of the adjustment element and increasing the volume level responsive to actuation of the second portion of the adjustment element.

2. The one or more computer-readable media of claim 1, the operations further comprising:
   receiving a first signal and a second signal from one or more sensing elements associated with the electronic device,
   wherein it is determined that the electronic device is positioned in the first orientation based at least in part on the first signal and it is determined that the electronic device is positioned in the second orientation based at least in part on the second signal, and wherein the first signal deviates from the second signal by more than a threshold value.

3. The one or more computer-readable media of claim 2, wherein the one or more sensing elements comprise an accelerometer.

4. The one or more computer-readable media of claim 1, wherein the first orientation corresponds to a landscape orientation of the electronic device and the second orientation corresponds to a portrait orientation of the device.

5. The one or more computer-readable media of claim 1, wherein the adjustment element comprises one or more switches comprising one or more mechanical components.

6. A method, comprising:

determining, by one or more processors, that an electronic device is oriented in a first orientation, wherein the electronic device comprises an adjustment element for adjusting a parameter associated with the electronic device;

associating, by the one or more processors and based at least in part on determining that the electronic device is oriented in the first orientation, a first adjustment of the parameter with actuation of a first portion of the adjustment element and associating a second adjustment of the parameter with actuation of a second portion of the adjustment element;

determining, by the one or more processors, that the electronic device has been reoriented to a second orientation that is different from the first orientation; and reversing, by the one or more processors and based at least in part on determining that the electronic device is oriented in the second orientation, directional adjustments of the parameter associated with actuation of the adjustment element, wherein reversing the directional adjustments comprises associating the second adjustment of the parameter with actuation of the first portion of the adjustment element and associating the first adjustment of the parameter with actuation of the second portion of the adjustment element.

7. The method of claim 6, wherein the parameter comprises at least one of: i) a volume level of audio information output by or input to the electronic device, ii) a magnification level of an image capturing device associated with the electronic device, or iii) a display parameter associated with a display of the electronic device.

8. The method of claim 6, wherein the first adjustment of the parameter comprises an increase in a value associated with the parameter and the second adjustment of the parameter comprises a decrease in the value associated with the parameter.

9. The method of claim 6, further comprising:

adjusting, by the one or more processors while the electronic device is oriented in the first orientation, the parameter in accordance with the first adjustment responsive to actuation of the first portion of the adjustment element and adjusting, by the one or more processors, the parameter in accordance with the second adjustment responsive to actuation of the second portion of the adjustment element.

10. The method of claim 9, further comprising:

adjusting, by the one or more processors while the electronic device is oriented in the second orientation, the parameter in accordance with the second adjustment responsive to actuation of the first portion of the adjustment element and adjusting the parameter in accordance with the first adjustment responsive to actuation of the second portion of the adjustment element.

11. The method of claim 6, wherein an orientation of the electronic device is determined upon or subsequent to actuation of the first portion or the second portion of the adjustment element.

12. The method of claim 6, wherein the adjustment element comprises a softkey configured to adjust a plurality of different parameters associated with the electronic device, wherein the parameter is included in the plurality of different parameters.

13. The method of claim 12, wherein the plurality of different parameters comprises at least two of:

i) a volume level of audio information output by the electronic device,
    ii) a volume level of audio information input to the electronic device,
    iii) a magnification level of an image capturing device associated with the electronic device, or
    iv) a display parameter associated with a display of the electronic device.

14. The method of claim 12, further comprising:

identifying, by the one or more processors, the parameter from among the plurality of different parameters based at least in part on one or more device settings.

15. The method of claim 14, wherein the one or more device settings comprise at least one of:

i) a device setting specified by a user of the electronic device, or
    ii) a device setting having a predetermined association with an application executing on the electronic device.

16. An electronic device, comprising:

at least one memory storing computer-executable instructions;
    at least one processor; and
    an adjustment element configured to adjust an operational parameter associated with the electronic device,
    wherein the at least one processor is configured to access the at least one memory and to execute the computer-executable instructions to:
    determine that the electronic device is positioned in a first orientation;
    increase a value associated with the operational parameter based at least in part on the determination that the electronic device is positioned in the first orientation and responsive to actuation of a first portion of the adjustment element;
    determine that the electronic device is repositioned in a second orientation different from the first orientation;
    reverse directional adjustments of the operational parameter associated with actuation of the adjustment element based at least in part on the determination that the electronic device is repositioned in the second orientation; and
    decrease the value associated with the operational parameter responsive to actuation of the first portion of the adjustment element.

17. The electronic device of claim 16, wherein the at least one processor is further configured to execute the computer-executable instructions to:

decrease the value associated with the operational parameter responsive to actuation of a second portion of the adjustment element while the electronic device is oriented in the first orientation; and
    increase the value associated with the operational parameter responsive to actuation of the second portion of the adjustment element while the electronic device is oriented in the second orientation.

18. The electronic device of claim 16, further comprising:

an accelerometer,
    wherein the at least one processor is configured to execute the computer-executable instructions to:
    determine that the electronic device is positioned in the first orientation based at least in part on a first signal received from the accelerometer; and
    determine that the electronic device is repositioned in the second orientation based at least in part on a second signal received from the accelerometer, wherein a respective value associated with each of the first signal and the second signal falls within a respective corresponding range of values.

19. The electronic device of claim 16, wherein the adjustment element comprises one of:
   i) a rocker switch,
   ii) a rotary switch, or
   iii) a plurality of push button switches.

20. The electronic device of claim 16, wherein the at least one processor is configured to execute the computer-executable instructions to:
   identify, based at least in part on one or more device settings, the operational parameter from a plurality of different operational parameters that the adjustment element is configured to adjust.

21. An electronic device, comprising:
   at least one memory storing computer-executable instructions;
   at least one processor;
   a first device component associated with a first function; and
   a second device component associated with a second function,
   wherein the at least one processor is configured to access the at least one memory and to execute the computer-executable instructions to:
      determine that an orientation associated with the electronic device is modified by more than a threshold amount, and
      reverse functionality associated with the first device component and the second device component by associating the second function with the first device component and associating the first function with the second device component.

22. The electronic device of claim 21, wherein the first device component is a first stereo speaker and the second device component is a second stereo speaker, wherein the first function associated with the first stereo speaker comprises outputting of first audio information using a first audio channel and the second function associated with the second stereo speaker comprises outputting of second audio information using a second audio channel.

23. The electronic device of claim 22, wherein the at least one processor is configured to reverse functionality associated with the first stereo speaker and the second stereo speaker by executing the computer-executable instructions to associate the first stereo speaker with the second audio channel and associate the second stereo speaker with the first audio channel.

24. The electronic device of claim 21, wherein a directionality associated with information output by the electronic device is maintained upon reversal of functionality associated with the first device component and the second device component.

25. The electronic device of claim 24, wherein the information output by the electronic device comprises audio information.

26. The electronic device of claim 21, wherein the threshold amount corresponds to rotation of the electronic device with respect to at least one axis by about 180 degrees.

* * * * *